United States Patent
Konda et al.

(10) Patent No.: US 8,250,252 B1
(45) Date of Patent: Aug. 21, 2012

(54) SYSTEM AND METHODS FOR USING A DMA MODULE FOR A PLURALITY OF VIRTUAL MACHINES

(75) Inventors: Dharma R. Konda, Aliso Viejo, CA (US); Rajendra R. Gandhi, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 110 days.

(21) Appl. No.: 12/826,105

(22) Filed: Jun. 29, 2010

(51) Int. Cl.
*G06F 13/00* (2006.01)

(52) U.S. Cl. .............. 710/22; 710/260; 718/1; 718/100; 711/203

(58) Field of Classification Search .................... 710/22, 710/260; 718/1, 100; 711/203
See application file for complete search history.

(56) References Cited

U.S. PATENT DOCUMENTS

| | | | |
|---|---|---|---|
| 6,564,271 B2 | 5/2003 | Micalizzi et al. | |
| 7,877,524 B1 * | 1/2011 | Annem et al. | 710/26 |
| 2010/0199275 A1 * | 8/2010 | Mudigonda et al. | 718/1 |
| 2011/0007746 A1 * | 1/2011 | Mudigonda et al. | 370/395.21 |

* cited by examiner

*Primary Examiner* — Tammara Peyton
(74) *Attorney, Agent, or Firm* — Klein, O'Neill & Singh, LLP (57) ABSTRACT

A system is provided. The system comprises a plurality of virtual machines executed by a computing system for sending and receiving information; and an adapter presented to the plurality of virtual machines as a shared hardware resource; wherein the adapter includes a direct memory access (DMA) module that is used for transferring control blocks to and from a computing system memory to an adapter memory, where the computing system memory has dedicated memory locations for each virtual machine to place the control blocks and the adapter memory has dedicated memory locations for storing the control blocks generated by each of the plurality of virtual machines; wherein the DMA module stores a context for each virtual machine that includes a computing system memory address assigned to each of the virtual machine and a quality of service entry that is used to limit a number of available control blocks that are transferred for a virtual machine at any given time when a control block from another virtual machine is available and there is storage space available to store the available control block for the other virtual machine.

17 Claims, 6 Drawing Sheets

SYSTEM AND METHODS FOR USING A DMA MODULE FOR A PLURALITY OF VIRTUAL MACHINES

TECHNICAL FIELD

The present invention relates to network and storage systems.

RELATED ART

Virtual machines are becoming popular in various computing environments, for example, storage and networking environments. Virtual machines are executed by a computing system and typically share a hardware resource. The machines operate as independent entities and issue commands for performing various functions involving shared hardware resources. Continuous efforts are being made to streamline processing of virtual machine commands while sharing limited hardware resources.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which includes using a DMA module for a plurality of virtual machines.

In one embodiment, a system is provided. The system comprises a plurality of virtual machines executed by a computing system for sending and receiving information; and an adapter presented to the plurality of virtual machines as a shared hardware resource; wherein the adapter includes a direct memory access (DMA) module that is used for transferring control blocks to and from a computing system memory to an adapter memory, where the computing system memory has dedicated memory locations for each virtual machine to place the control blocks and the adapter memory has dedicated memory locations for storing the control blocks generated by each of the plurality of virtual machines; wherein the DMA module stores a context for each virtual machine that includes a computing system memory address assigned to each of the virtual machine and a quality of service entry that is used to limit a number of available control blocks that are transferred for a virtual machine at any given time when a control block from another virtual machine is available and there is storage space available to store the available control block for the other virtual machine.

In another embodiment, method for transferring control blocks using a direct memory access (DMA) module from a computing system memory location assigned to one of a plurality of virtual machines to an adapter memory location, assigned to the virtual machine, is provided. The method comprises (a) determining if a control block for the virtual machine is available at the assigned location of the computing system memory; (b) determining if space is available at the assigned adapter memory location; (c) transferring the control block from the computing system memory to the adapter memory; (d) updating a first memory address list indicating to an adapter processor that the control block is transferred to the assigned memory location and the assigned memory location is no longer available; (e) updating a first pointer array indicating to the virtual machine that the control block is transferred; (f) performing steps (a) to (e) for a next control for the virtual machine, if a quality of service (QOS) number assigned to the virtual machine has not been exceeded, the QOS number configured to limit transfer of control blocks for the same virtual machine, if control blocks for other virtual machines are waiting for transfer and space is available to store the control blocks.

In yet another embodiment, an adapter is provided. The adapter comprises a direct memory access (DMA) module that is used for transferring control blocks to and from a computing system memory to an adapter memory, where the computing system executes a plurality of virtual machines and the adapter is presented to the plurality of virtual machines as a shared hardware resource; wherein the computing system memory has dedicated memory locations for each virtual machine to place the control blocks and the adapter memory has dedicated memory locations for storing the control blocks transferred to the adapter; wherein the DMA module stores a context for each virtual machine that includes a computing system memory address assigned to each of the virtual machine and a quality of service entry that is used to limit a number of available control blocks that are transferred for a virtual machine at any given time when a control block from another virtual machine is available and there is storage space available to store the available control block for the other virtual machine; wherein the DMA module maintains a first pointer array that is updated by a virtual machine to indicate that a control block is available for transfer and a second pointer array that is updated by the DMA module when the control block for the virtual machine is transferred.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Figure 1A:
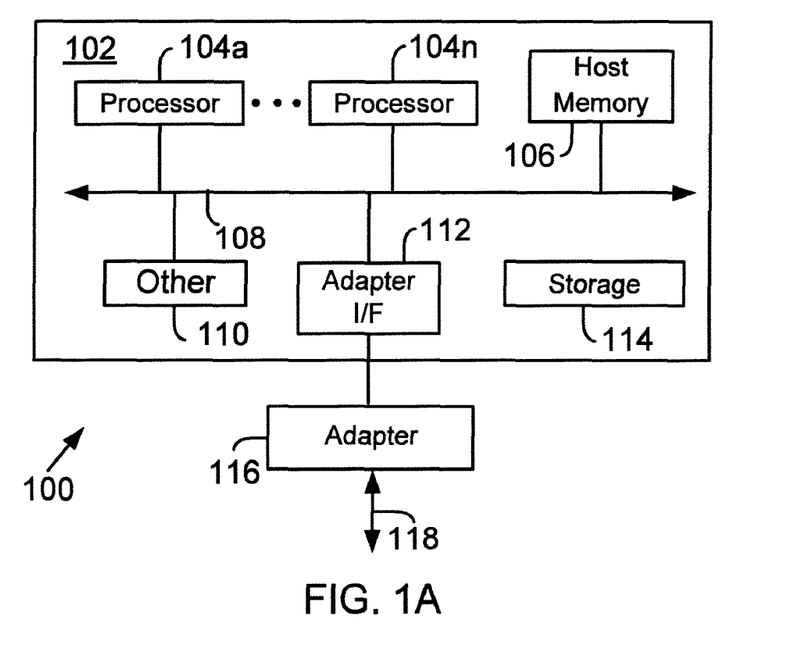
FIG. 1A is a block diagram of a system used according to one embodiment.

System:

FIG. 1A is a block diagram of a generic network system 100 having a computing system 102 (may also be referred to as "host system 102") coupled to an adapter 116 that interfaces with a storage system and/or a network device via a link 118. There may be other systems/components that may be placed between the aforementioned components but they are not germane to the embodiments disclosed herein.

Host system 102 may include one or more processors 104a-104n (jointly referred to as processor 104 or processors 104), also known as a central processing unit (CPU), interfacing with other components via a bus 108. Bus 108 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of interconnect.

Host system 102 may also include or have access to a storage device 114, which may be for example a hard disk, a CD-ROM, a non-volatile memory device (flash or memory stick) or any other device. Storage device 114 may store processor executable instructions and data, for example, operating system program files, application program files, and other files. Some of these files are stored on storage 114 using an installation program. For example, processor 104 may execute computer-executable process steps of an installation program so that the processor 104 can properly execute an application program.

Host system 102 interfaces with memory 106 that may include random access main memory (RAM), and/or read only memory (ROM). When executing stored computer-executable process steps from storage 114, processor 104 may store and execute the process steps out of memory 106. ROM may store invariant instruction sequences, such as start-up instruction sequences or basic input/output operating system (BIOS) sequences for operation of a keyboard (not shown).

Host system 102 may also include other devices and interfaces 110, which may include a display device interface, a keyboard interface, a pointing device interface and others.

Host system 102 may also include an adapter interface 112 that allows the host system to interface with adapter 116. The link between adapter 116 and adapter interface 112 may be a peripheral bus, for example, a PCI, PCI-X or PCI-Express link. Adapter 116 can be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 116 can be configured to operate as a FCOE adapter and may be referred to as FCOE adapter 116. QLogic Corporation, the assignee of the present application, provides one such adapter. Those of ordinary skill in the art will appreciate, however, that the present embodiments are not limited to any particular protocol. The illustrated FCOE adapter 116 is merely one example of a converged network adapter that may leverage the advantages of the present embodiments.

Figure 1B:
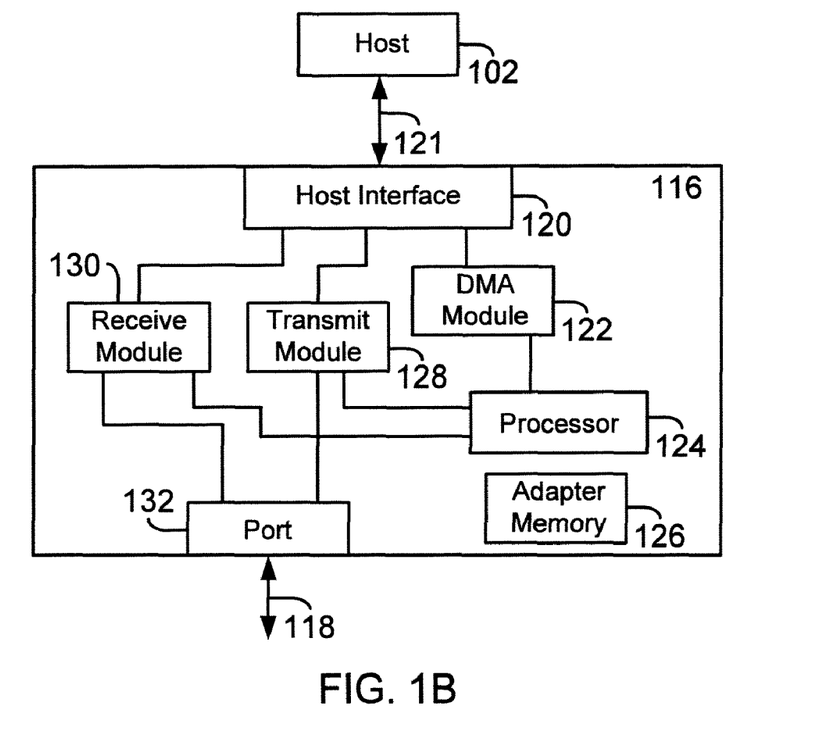
FIG. 1B shows a block diagram of an adapter, used according to one embodiment.

Adapter 116:

Before describing the various aspects of the inventive embodiments, the following provides a brief description of adapter 116 with respect to FIG. 1B, as used by the various embodiments disclosed herein. FIG. 1B shows an example, of adapter 116 used for sending and receiving information to and from host 102. Adapter 116 may include a host interface 120, a direct memory access (DMA) module 122, an adapter processor 124 having access to local memory 126, a transmit module 128, a receive module 130 and a port 132.

The host interface 120 is configured to interface with host system 102, via a link 121 (also referred to as bus 121). As an example, link 121 may be a PCI, PCI-X, PCI-Express bus or any other type of interconnect.

Memory 126 may be used to store programmable instructions, for example, adapter firmware and other information. Adapter processor 124 executes firmware instructions from memory 126 to control the overall functionality of adapter 116.

DMA module 122 is used to access bus 121 to move information from local memory 126 or other storage location of adapter 116 to memory storage locations managed by the host system 102, for example, host memory 106. Details regarding DMA module 122 are provided below.

Receive module 130 includes logic and circuitry for receiving information from link 118. The received information is then sent to host 102 via host interface 120. The structure of receive module 130 is such that it can handle incoming network and storage traffic.

Transmit module 128 includes logic and circuitry to handle information that is sent by host system 102 and then transmitted via link 118 to a storage location, a network device or any other device. The structure of transmit module 128 is such that it can transmit both network and storage related information (or packets).

Port 132 includes logic and circuitry for sending and receiving information to and from link 118. For example, if adapter 116 is configured to transmit and receive FCoE frames, then port 132 includes logic and circuitry that enables port 132 to send and receive FCoE frames.

Figure 2A:
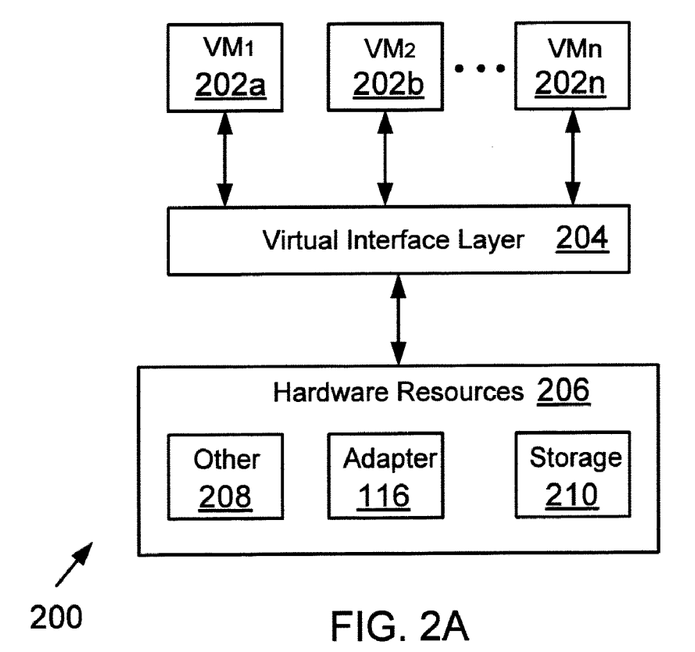
FIGS. 2A-2B show a block diagram of a virtual environment, according to an embodiment.

Virtual Environment:

The adaptive embodiments disclosed herein can be used in a virtual environment 200 that is now described below with respect to FIG. 2A. Virtual environment 200 is provided on a computing system platform such that multiple virtual machines can share hardware resources. As an example, virtual environment 200 is provided by VMWare Inc. and Microsoft Corp.

Virtual environment 200 includes a plurality of virtual machines 202*a*-202*n* (shown as VM1, VM2 . . . VMn) that are executed by a computing system, for example, host system 102. Each virtual machine can be viewed as an independent operating system image executed by host system 102. For example, VM1 202*a* may be a Windows based operating system, VM2 202*b* may be a Linux based operating system and VMn 202*n* may be a Solaris based operating system and so on. The term virtual machine and system image are used interchangeably throughout this specification.

Virtual interface layer (VIL) 204 manages the virtual machines and presents various hardware resources 206 to the virtual machines. The hardware resources 206 may include a storage device 210, adapter 116 or any other resource 208. An example of VIL is the Hypervisor layer provided by VmWare Inc. or the Hyper-V layer provided by Microsoft Corporation. In one embodiment, VIL 204 is executed by an independent computing system. In another embodiment, VIL 204 and the virtual machines are executed by the same computing system.

Each virtual machine is provided with a virtualized image of adapter 116. Each virtual machine can hence use the same physical adapter 116 for input/output (I/O) operations as well as communicating with other devices.

In one embodiment, a port of adapter 116 is identified using multiple unique identifiers. One such identifier is called NPIV (i.e. N_Port virtual ID virtualization) identifier, used in the Fibre Channel environment. By using NPIV, a single physical port (for example 132, FIG. 1B) can be assigned multiple unique identifier values. This allows one physical port to be presented as a different port to different virtual machines. The virtual machines believe that they have a dedicated adapter port, while in reality; the same port is presented with a different identifier.

Figure 2B:
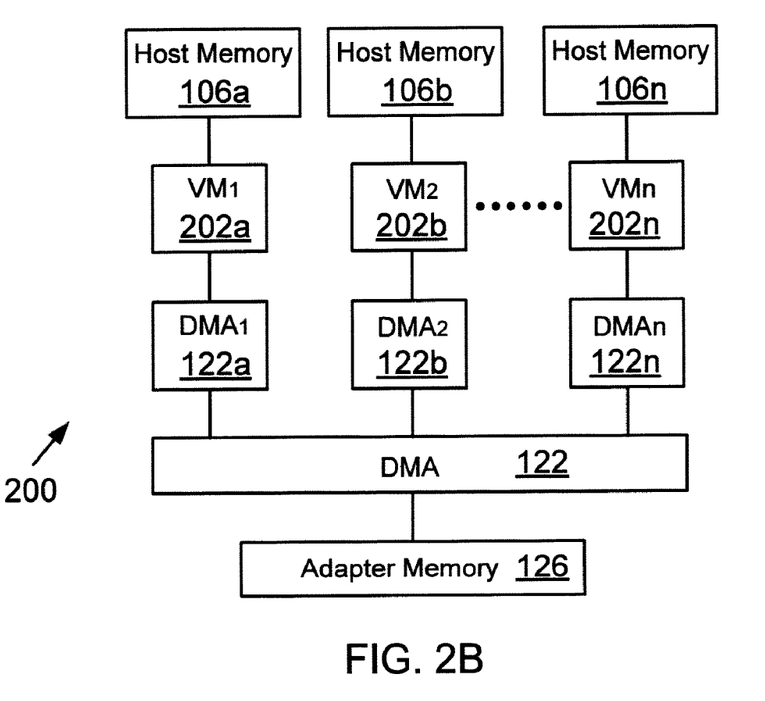

FIG. 2B shows another example of virtual environment 200 where the DMA module 122 (FIG. 1B) of adapter 116 is presented as a virtual entity shown as DMA1 122*a*, DMA2 122*b* . . . DMAn 122*n*. Each virtual image has access to a portion of host system memory 106, shown as 106*a*, 106*b* . . . 106*n*. For example, VM1 202*a* has access to 106*a*, VM2 202B has access to 106*b* and VMn 202*n* has access to 106*n*.

Each DMA module 122*a*-122*n* interfaces with an assigned virtual machine for sending and receiving information. DMA module 122 operates in adapter 116 and interfaces with each virtual machine, as if it was interfacing with independent computing systems. Details of how DMA module 122 interfaces with various virtual machines are provided below with respect to FIGS. 3A-3B.

Figure 3A:
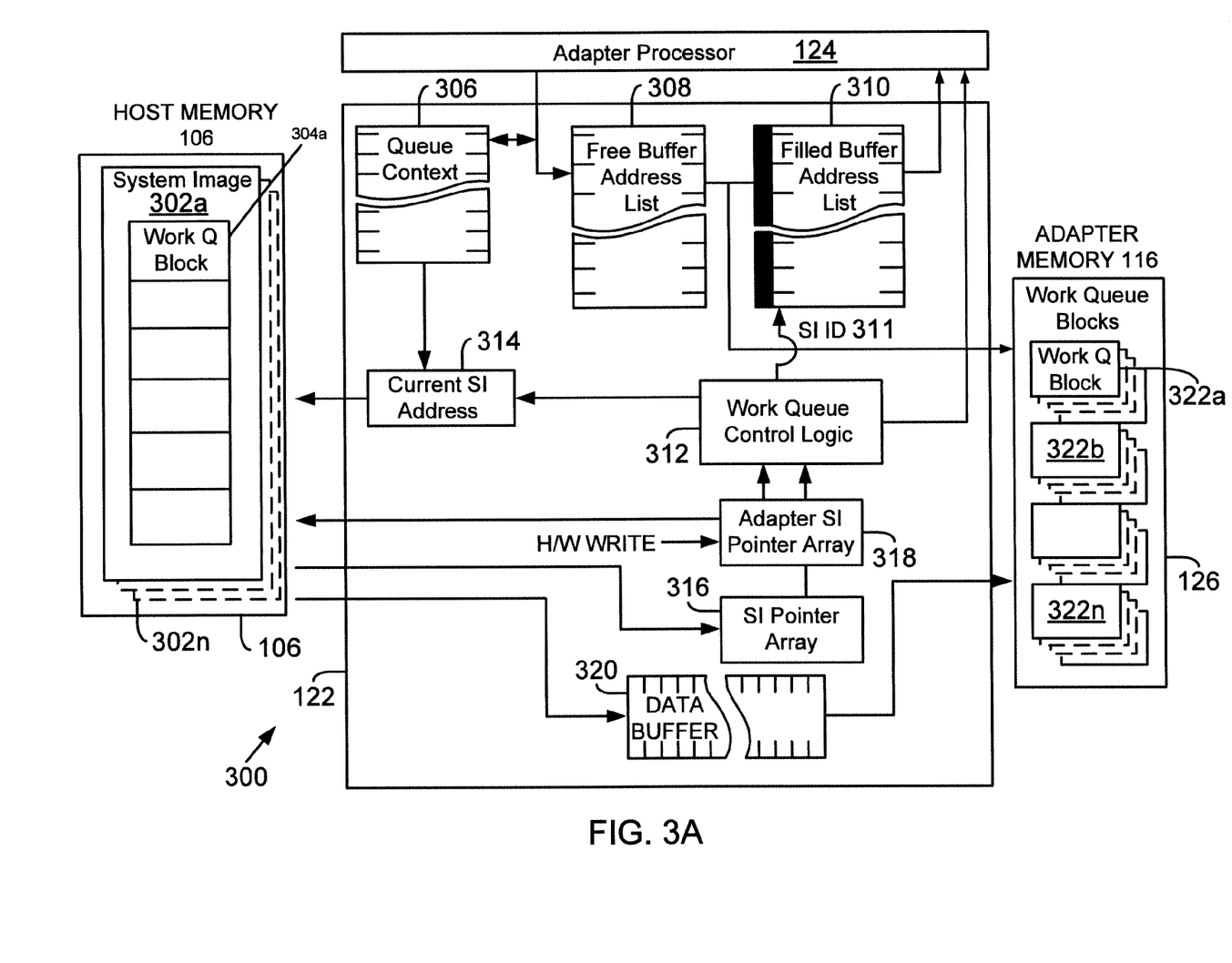
FIG. 3A shows a system for executing requests from different virtual machines, used according to an embodiment.

Work Queue Management:

FIG. 3A shows a system for executing requests from different virtual machines, according to one embodiment. The requests can be referred to as "work queue control blocks", input/output control blocks ("IOCBs") or simply as control blocks. The control blocks include information regarding an operation that needs to be performed. For example, for a write operation where a virtual machine wants to write to a storage device, the control block will include a command for the write operation, an address or an indicator pointing to an address where the information that is to be written is located and any other information that is needed for performing the write operation.

The control blocks are stored in host memory 106 and read by adapter 116. Based on the information in the control blocks, adapter 116 performs or assists in performing the requested task.

The host memory 106 stores a plurality of system images 302*a*-302*n*. Each system image is essentially an operating system image for a virtual machine. For example, system image 302*a* may be for virtual machine 202*a* (FIG. 2*a*), system image 302*b* may be for virtual machine 202*b* and so forth. The term system image and virtual machine are used interchangeably throughout this specification.

Each system image is assigned a portion of memory 106 for storing work queue control blocks. As an example, system image 302*a* is assigned memory location 304*a* for storing work queue control blocks that are generated by system image 302*a*. The work queue control blocks are copied to adapter memory 126, as described below in more detail. System image 302*b*-302*n* are also assigned a similar segment of memory 106 for storing work queue control blocks that are generated by system images 302*b*-302*n*.

DMA module 122 includes various modules for managing automatic transfer of work queue blocks from host memory 106 to local memory 126, according to one embodiment. DMA module 122 includes work queue control logic 312 (may also be referred to as control logic 312) that manages overall transfer of control blocks from host memory 106 to local memory 126. As described below in more detail, control logic 312 manages flow of control blocks and notifies the virtual machines and processor 124, once the control blocks have been transferred to and from host memory 106.

DMA module 122 also includes a queue context block 306 (also referred to as queue context 306) that is initialized by processor 124. Queue context 306 is a storage location that is used to store context information for different virtual machines. A user can program and configure parameters for different machines. Queue context 306 can be used to store an address, an address type, a PCI function number, a PCI virtual function number, a queue depth value and any quality of service parameters.

The system image address is a virtual machine host memory address where work and completion queues are located. The address type information indicates if the host memory address is a physical address that does not require any translation or a virtual address that requires host system to translate it to a physical address.

The PCI function number identifies a PCI function associated with a system image. The term "function" as used herein is defined by the PCI/PCI-Express standard and includes a set of standardized control/status registers, which a host system module (in this case a virtual machine or a driver operating on behalf of a virtual machine) uses to communicate with adapter 116. In a broad sense, the term function may be used to identify an adapter resource that is accessible to a host system component.

The PCI virtual function number identifies a virtual function that is presented to a virtual machine. For example, when an adapter physical function/resource (for example, a DMA module 122) is shared, then a virtual function number is used to identify the shared resource.

The queue depth provides a size of the queue in terms of a number of control blocks that the queue can hold. The QOS entry for a system image (or virtual machine) defines a number of control blocks that are transferred from host memory to adapter 116 for a particular virtual machine within a given arbitration cycle. The QOS entry for each system image determines how long each virtual machine has access to adapter 116 and its resources within the given arbitration cycle. Arbitration is used to select a system image when more than one system image is requesting access at any given time.

Local memory 126 of adapter 116 includes a plurality of memory locations that can be referred to as buffers. The buffers are assigned to individual system images and are used to store control blocks for the respective system images. The buffers are shown as 322a-322n. In this example, buffers 322a (shown as work queue blocks) may be used for storing control blocks that are sent by system image 302a, buffers 322b may be assigned to system image 302b and so forth.

DMA module 122 maintains two buffer address lists, a free buffer address list 308 and a filled buffer address list 310. The free buffer address list 308 is populated by adapter processor 124 and identifies memory locations in local memory 126 that are free at any given time. The free buffer address list 308 also uses a system image identifier (may also be referred to as a tag) to identify the system image that is assigned a memory location.

The filled buffer address list 310 is managed by DMA module 122 in general and control logic 312 in particular. When a control block is transferred to a memory location at local memory 126, control logic 312 copies information from the filled buffer address list which includes the buffer location and the system image identifier. This indicates to processor 124 that a control block transfer from host memory 106 to a local memory 126 location is complete. The system image identifier identifies the virtual machine that sent the control block.

DMA module 122 may also include two pointer arrays 316 and 318. A pointer array is used to store pointers. A pointer is an indicator to a memory location where information is stored. For example, a pointer can point to a memory location in 304a where a control block for system image 302a is stored. The first pointer array 316 is updated by the virtual machines. This indicates to DMA module 122 that a control block for a virtual machine is ready for transfer.

The second pointer array 318 is maintained by DMA module 122. Pointer array 318 is updated by control logic 312 when a control block is transferred from a host memory 106 location to a local memory 126 location.

Control logic 312 monitors pointer array 316 to determine if there are any control blocks for a particular system image. If a control block and a free buffer for the system image are available as indicated by the free buffer list 308, DMA module 122 initiates a DMA operation to move the control block from host memory 106 to a data buffer 320, before eventually moving the control block to a local memory location assigned to the system image that generated the control block. Data buffer 320 is a temporary memory location for storing in transit control blocks.

As long as space is available at local memory 126 and control blocks are available at host memory 106, control logic 312 continues to process control blocks for a particular system image based on the QOS entry stored in queue context 306. This is indicated by the current system image (SI) address 314 that shows which system image the control logic 312 is processing at any given time. Control logic 312 uses the QOS entry to stop transferring control blocks for a particular system image so that other system images that may have available control blocks get an opportunity to send their requests.

Figure 3B:
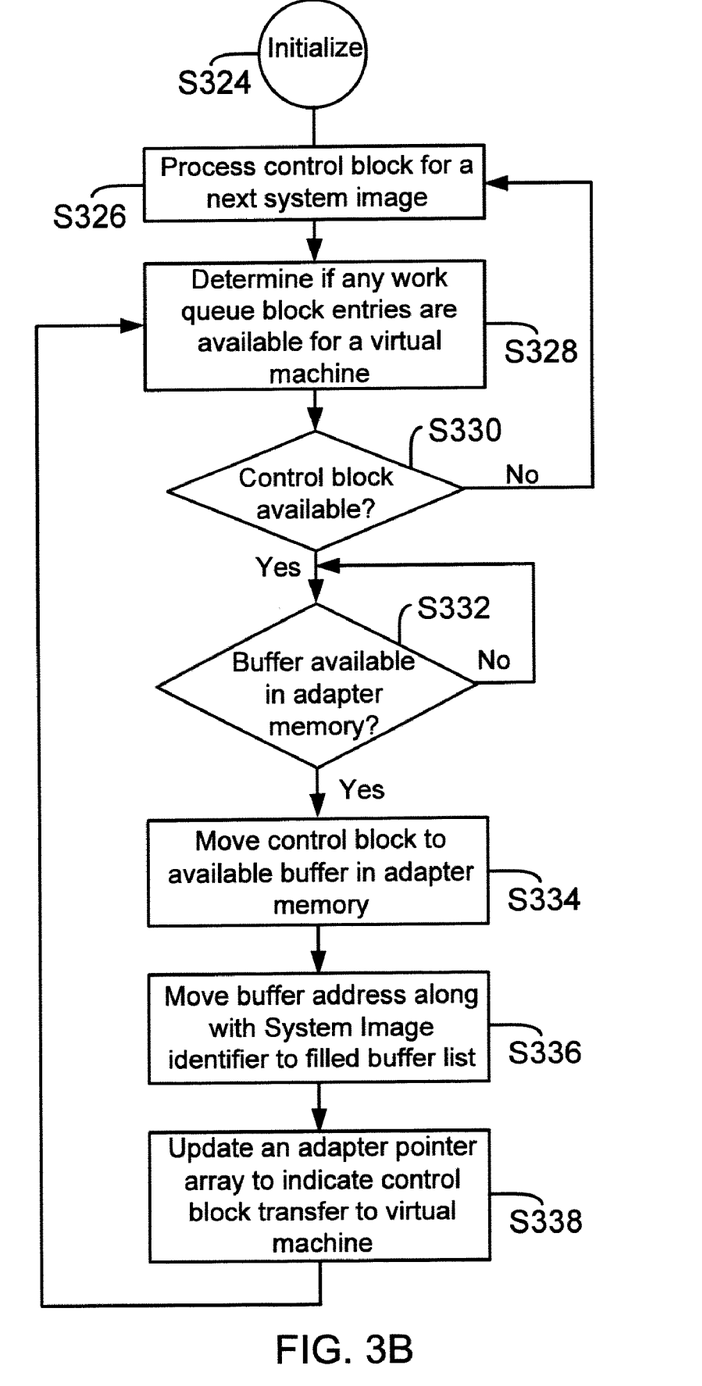
FIG. 3B shows a process flow diagram, according to one embodiment.

FIG. 3B shows a process flow diagram for transferring control blocks for a plurality of virtual machines, according to one embodiment. The process begins in block S324, when DMA module 122 is initialized. During initialization, queue context 306 entries are populated and the free buffer address list 308 is refreshed by processor 124.

In block S326, control logic 312 starts monitoring the pointer arrays 316 and 318 for a next available system image control block. In block S328, control logic 312 compares pointer array 316 and 318 entries to determine if any new control block for a system image is available for transfer. If a control block is not available, as determined in block S330, the process moves back to block S326, where the control logic 312 evaluates a next system image.

If a control block for a system image is available, then in block S332, control logic 312 reads the free buffer list 308 to determine if a buffer space is available in the local memory 126. If buffer space is available, then control logic 312 provides context information from queue context 306 to the current system image address 314 block in block S334 and initiates a DMA transfer of the control block from host memory 106 to local memory 126. In one embodiment, the transfer is via data buffer 320. If buffer space is not available then control logic simply waits.

After the transfer, in block S336, control logic 312 moves the buffer address from the free buffer address list 308 to the filled buffer address list 310. Control logic 312 also copies the system image identifier (311, FIG. 3A) to the filled buffer address list 310. This associates the system image with the recently transferred control block in memory 126. Processor 124 can then determine where a particular control block is located and which system image is associated with the control block.

Thereafter, in block S338, control logic 312 (or processor 124) updates adapter pointer 318. The updated entry indicates to the system image that the control block has been transferred.

Thereafter the process moves back to block S328 for transferring a next block for the same virtual machine if the QOS entry for the virtual machine has not been exceeded. For example, the queue context 306 for a virtual machine may be set to 10 for a given arbitration cycle. DMA module 122 determines if it has transferred 10 control blocks within the arbitration cycle before executing block S328.

When all the control blocks not exceeding the QOS entry count are transferred (maximum of 10 in this example), then DMA module 122 stores the queue context information back to queue context 306 for later use in the next arbitration cycle and moves to the next virtual machine in block S326.

After a control block is transferred, processor 124 performs the operation or assists in an operation that is mentioned in the control block. Once the operation is completed, processor 124 places a completion block at local memory 126 to indicate that the operation has been completed. Local memory 126 may have assigned locations for storing completion blocks for a plurality of system images. This is shown as 342a-342n in FIG. 3C that is now described in detail below.

Figure 3C:
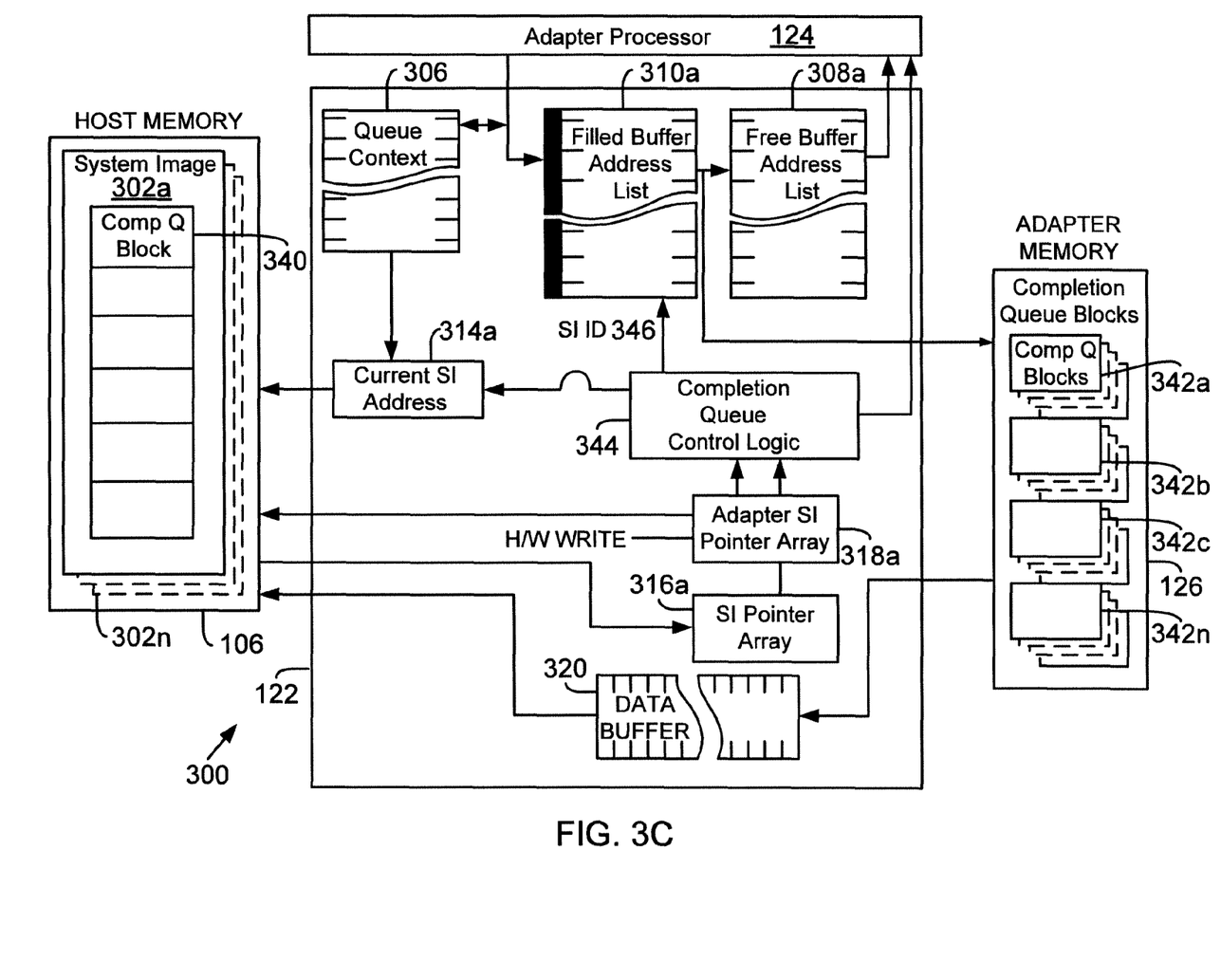
FIG. 3C shows a block diagram of various modules used by DMA module, according to an embodiment.

Completion Queue Management:

FIG. 3C shows various modules used by DMA module 122 for processing completion blocks, according to one embodiment. DMA module 122 includes a completion queue control logic 344 (may also be referred to as control logic 344) for interfacing with other modules. Control logic 344 may be separate from control logic 312 of FIG. 3A or integrated as a single component.

Local memory 126 assigns specific memory locations for each virtual machine. Processor 124 places a completion block at an assigned location for indicating that an operation for a system image has been completed. Once the completion block is placed, processor 124 updates an entry in the filled buffer list 310A indicating that a completion block is available for transfer. A system image identifier associated with the completion block is also provided to control logic 344.

Host memory 106 also assigns memory storage locations 340 for storing completion blocks for each system image (similar to 304 in FIG. 3A) received from adapter 116 via data buffer 320. When space is available at host memory location 340, a virtual machine updates pointer array 316A indicating to control logic 344 that there is space available for storing a control block for the particular virtual machine.

DMA 122 monitors the filled buffer address list 310a to determine if completion blocks are available for transfer. Control logic 344 uses the system image identifier 346 and compares a SI pointer array 316A entry with an adapter SI pointer array 318A entry to determine if space is available to store a completion block at host memory 106. If space is available, then queue context 306 information for the system image identified by the system image identifier is loaded and the completion block is transferred from local memory 126 to host memory 106.

Control logic 344 then transfers the memory address from the filled buffer list 310A to the free buffer address list 308A indicating to processor 124 that the completion block from a specific memory location and for a specific virtual machine has been transferred. Control logic 344 also updates pointer array 318A to indicate to the host system that the completion block transfer has been completed.

Control logic 344 transfers completion blocks for a virtual machine as they become available indicated by the entries in the filled buffer list 310A. If space in host memory 106 is unavailable, control logic 344 waits for space to be available. Furthermore, control logic 344 may also use the QOS entry for a virtual machine to limit the number of control blocks that are transferred for a particular virtual machine in a given arbitration cycle, such that control blocks for other virtual machines can be transferred.

Figure 3D:
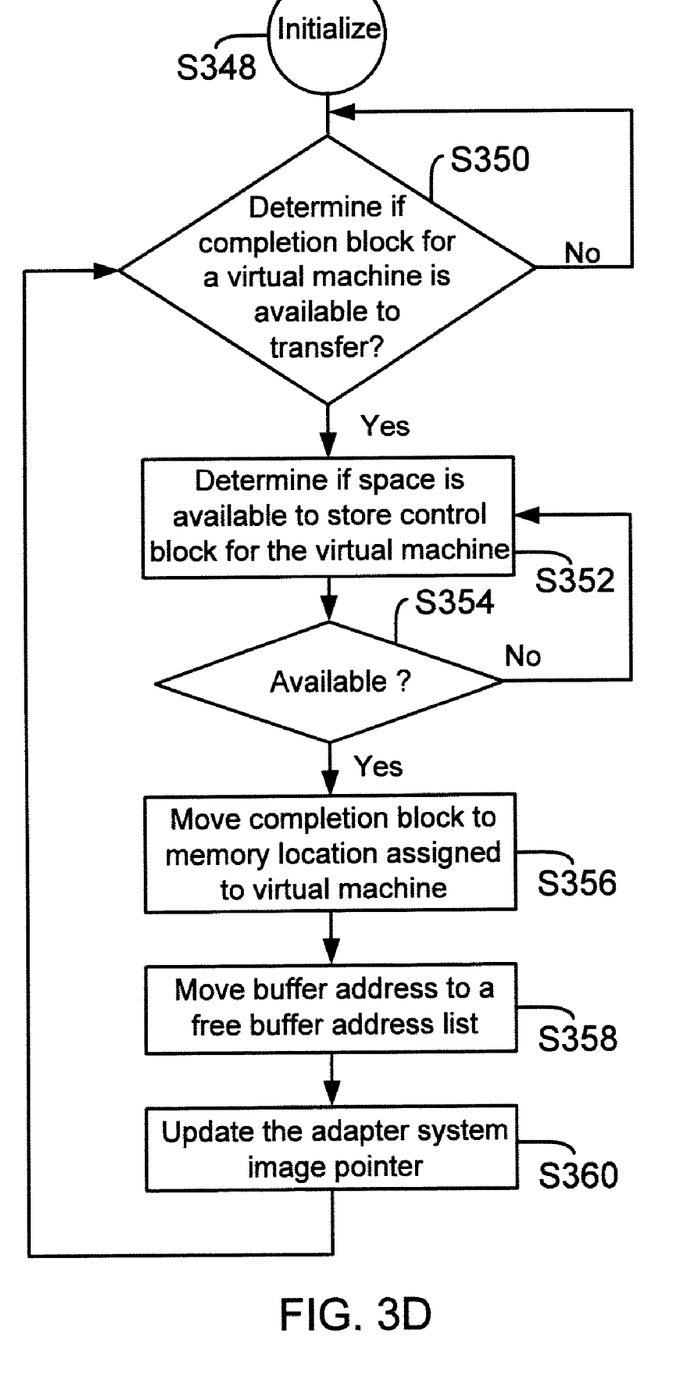
FIG. 3D shows a process flow diagram for transferring completion blocks from a local memory to a host memory, according to one embodiment.

FIG. 3D shows a process flow diagram for transferring completion blocks from local memory 126 to host memory 106, according to one embodiment. The process begins with an initialization block S348, when DMA module 122 is initialized.

In block S350, control logic 344 checks the filled buffer list 310a to determine if a completion block for a virtual machine is available for transfer from a location in local memory 126. If a completion block is unavailable, DMA module 122 simply waits.

If a completion block is available, then in block S352, control logic 344 compares pointer array 316A and 318A entries for a system image identifier provided by the filled buffer list 310a to determine if space is available in host memory 106 for the identified virtual machine. After the comparison, in block S354, control logic 344 determines if space is available. If no space is available, the process moves back to block S352.

If space is available, then in block S356, the queue context 306 for the system image identifier being processed is transferred to the current system image address 314A block and the completion block is transferred from local memory 126 to host memory 106 via data buffer 320.

Thereafter, in block S358, the buffer address from the filled buffer list 310A is moved to the free buffer list 308A, indicating to processor 124 that the control block transfer is complete.

In block S360, pointer array 318A is updated to indicate to the host system that the completion block has been transferred and the process moves back to block S350. When all the completion blocks indicated by a QOS entry are transferred, the context information from the current system image Address 314 block is stored back into the queue context 306 for later use in a next arbitration cycle.

The embodiments disclosed herein provide a mechanism for handling control blocks generated by a plurality of virtual machines. Each virtual machine is provided with a virtual instance of a DMA module and the virtual instance is used by the virtual machines for initiating control blocks. The DMA module manages the control block transfer by maintaining information regarding the virtual machines, managing buffer addresses and pointer arrays. The virtual machines are not aware of how the control blocks are being transferred.

In one embodiment, the system and method provide a QOS entry that allows a user to configure how long a DMA channel resources are allocated and used between virtual machines. The user can also use customize virtual machines to transfer information using the queue context parameters such as queue depth, address Type and others.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A system, comprising:
a plurality of virtual machines executed by a computing system for sending and receiving information; and
an adapter presented to the plurality of virtual machines as a shared hardware resource;
wherein the adapter includes a direct memory access (DMA) module that is used for transferring control blocks to and from a computing system memory to an adapter memory, where the computing system memory has dedicated memory locations for each virtual machine to place the control blocks and the adapter memory has dedicated memory locations for storing the control blocks generated by each of the plurality of virtual machines; and
wherein the DMA module stores a context for each virtual machine that includes a computing system memory address assigned to each of the virtual machines and a quality of service entry that is used to limit a number of available control blocks that are transferred for a given one of the virtual machines at any given time when a control block from another one of the virtual machines is available and there is storage space available to store the available control block for the other one of the virtual machines.

2. The system of claim 1, wherein the DMA module maintains a first pointer array that is updated by a virtual machine to indicate that a control block is available for transfer and a second pointer array that is updated by the DMA module when the control block for the virtual machine is transferred.

3. The system of claim 1, wherein the DMA module maintains a first memory address list that is updated by an adapter processor to indicate to the DMA module that a memory location assigned to a virtual machine is available for storing a control block.

4. The system of claim 3, wherein the DMA module maintains a second memory address list that is updated by the DMA module to indicate to the adapter processor that a control block from a memory location assigned to a virtual machine has been transferred to a computing system memory location.

5. The system of claim 1, wherein the DMA module maintains a temporary memory location for temporarily storing a control block that is transferred from a computing system memory location to an adapter memory location assigned to a virtual machine.

6. The system of claim 2, wherein the DMA module includes logic for monitoring the first pointer array and the second pointer array for determining if a control block for a virtual machine is available for transfer and space to store the control block at the adapter memory is available for storing the control block after the transfer.

7. A method for transferring control blocks using a direct memory access (DMA) module from a computing system memory location assigned to one of a plurality of virtual machines to an adapter memory location assigned to the virtual machine, comprising:

(a) determining if a control block for the virtual machine is available at the assigned location of the computing system memory;
(b) determining if space is available at the assigned adapter memory location;
(c) transferring the control block from the computing system memory to the adapter memory;
(d) updating a first memory address list indicating to an adapter processor that the control block is transferred to the assigned memory location and the assigned memory location is no longer available;
(e) updating a first pointer array indicating to the virtual machine that the control block is transferred;
(f) performing steps (a) to (e) for a next control block for the virtual machine, if a quality of service (QOS) number assigned to the virtual machine has not been exceeded, the QOS number being configured to limit transfer of control blocks for the same virtual machine, if control blocks for other virtual machines are waiting for transfer and space is available to store the control blocks for the other virtual machines.

8. The method of claim 7, wherein the DMA module maintains the first pointer array that is updated by the virtual machine to indicate that the control block is available for transfer.

9. The method of claim 8, wherein the DMA module maintains a second pointer array that is updated by the DMA module when the control block for the virtual machine is transferred.

10. The method of claim 7, wherein the DMA module maintains a second memory address list that is updated by an adapter processor to indicate to the DMA module that a memory location assigned to the virtual machine is available for storing a control block.

11. The method of claim 7, wherein the DMA module maintains a temporary memory location for temporarily storing a control block that is transferred from a computing system memory location to an adapter memory location assigned to the virtual machine.

12. The method of claim 9, wherein the DMA module includes logic for monitoring the first pointer array and the second pointer array for determining if a control block for the virtual machine is available for transfer and space to store the control block at the adapter memory is available for storing the control block after the transfer.

13. An adapter, comprising:
a direct memory access (DMA) module that is used for transferring control blocks between a computing system memory and an adapter memory, where the computing system executes a plurality of virtual machines and the adapter is presented to the plurality of virtual machines as a shared hardware resource;
wherein the computing system memory has dedicated memory locations for each virtual machine to place the control blocks, and the adapter memory has dedicated memory locations for storing the control blocks transferred to the adapter;
wherein the DMA module stores a context for each virtual machine that includes a computing system memory address assigned to each of the virtual machines and a quality of service entry that is used to limit a number of available control blocks that are transferred for a given one of the virtual machines at any given time when a control block from another one of the virtual machines is available and there is storage space available to store the available control block for the other one of the virtual machines; and wherein the DMA module maintains a first pointer array that is updated by one of the virtual machines to indicate that a control block is available for transfer and a second pointer array that is updated by the DMA module when the control block for the one of the virtual machines is transferred.

14. The adapter of claim 13, wherein the DMA module maintains a first memory address list that is updated by an adapter processor to indicate to the DMA module that a memory location assigned to a virtual machine is available for storing a control block.

15. The system of claim 13, wherein the DMA module maintains a second memory" address list that is updated by the DMA module to indicate to the adapter processor that a control block from a memory location assigned to a virtual machine has been transferred to a computing system memory location.

16. The system adapter of claim 13, wherein the DMA module maintains a temporary memory location for temporarily storing a control block that is transferred from a computing system memory location to an adapter memory location assigned to a virtual machine.

17. The system adapter of claim 13, wherein the DMA module includes logic for monitoring the first pointer array and the second pointer array for determining if a control block for a virtual machine is available for transfer and space to store the control block at the adapter memory is available for storing the control block after the transfer.

* * * * *

UNITED STATES PATENT AND TRADEMARK OFFICE
CERTIFICATE OF CORRECTION

| | | |
|---|---|---|
| PATENT NO. | : 8,250,252 B1 | Page 1 of 1 |
| APPLICATION NO. | : 12/826105 | |
| DATED | : August 21, 2012 | |
| INVENTOR(S) | : Dharma R. Konda et al. | |

It is certified that error appears in the above-identified patent and that said Letters Patent is hereby corrected as shown below:

In column 5, line 38, delete "FCoE" and insert -- FCOE --, therefor.

In column 5, line 40, delete "FCoE" and insert -- FCOE --, therefor.

In column 10, line 5, delete "Q0S" and insert -- QOS --, therefor.

In column 10, line 42, delete "Address" and insert -- address --, therefor.

In column 13, line 13, in Claim 15, delete "system" and insert -- adapter --, therefor.

In column 13, line 14, in Claim 15, delete "memory" address" and insert -- memory address --, therefor.

In column 14, line 4, in Claim 16, after "The" delete "system".

In column 14, line 9, in Claim 17, after "The" delete "system".

Signed and Sealed this
Thirteenth Day of November, 2012

David J. Kappos
*Director of the United States Patent and Trademark Office*